Dec. 10, 1957 R. S. STRIMEL 2,815,675
DRIVING MECHANISM FOR RECORDER PENS OR THE LIKE
Original Filed June 11, 1951 2 Sheets-Sheet 1

INVENTOR
Robert S. Strimel
Synnestvedt + Lechner
ATTORNEYS

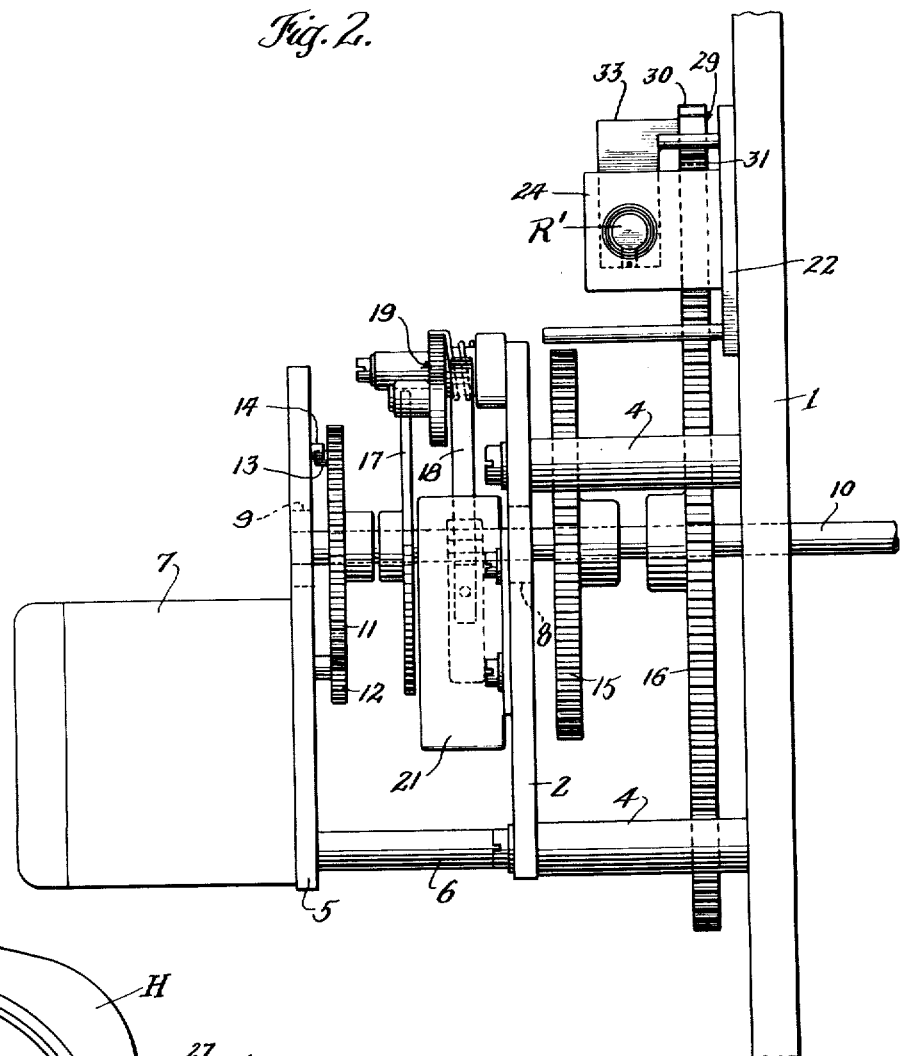
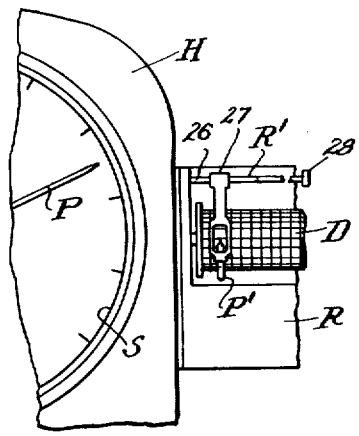

United States Patent Office 2,815,675
Patented Dec. 10, 1957

2,815,675

DRIVING MECHANISM FOR RECORDER PENS OR THE LIKE

Robert S. Strimel, Conshohocken, Pa., assignor to Tinius Olsen Testing Machine Company, Willow Grove, Pa., a corporation of Pennsylvania Original application June 11, 1951, Serial No. 230,877, now Patent No. 2,808,721, dated October 8, 1957. Divided and this application April 27, 1954, Serial No. 425,829

6 Claims. (Cl. 74—422)

This invention relates generally to drum-pen type recorders for use with testing machines and, in particular, relates to drive mechanism for the pen of such a recorder.

The subject matter of the invention is fully described in my copending application, Serial No. 230,877, filed June 11, 1951, now Patent No. 2,808,721, and entitled a Registering System for Use in Conjunction With Testing Machines, of which this application is a division.

My copending application discloses a testing machine comprising an upright housing having a scale and a pointer to be observed by the operator making tests. The pointer is driven in accordance with the load or stress applied to an article being tested, for example, tests in compression, flexure or tension. On one side of the housing is disposed a drum-pen type recorder which may be used for the recording of stress-strain curves, the drum being driven in accordance with strain and the pen being driven in accordance with stress. As pointed out in that application, it is highly desirable, in making such stress-strain curves, to provide for magnification of the recording to enable detailed study of specimen behavior.

The present invention concerns mechanism actuable by the indicating pointer driving system which moves the recorder pen and also provides for magnification of the stress record made by the pen.

The invention contemplates mechanism disposed within the housing of a testing machine comprising a rod mounted both for translational and rotational movement, one end of the rod projecting outside of the housing and carrying a pen to be moved over the drum of the recorder. The rod is disposed interjacent two gears, one small and one large, which preferably are directly attached to the drive shaft of the testing machine pointer. A rack having sets of teeth on two opposing faces is secured to the rod such that when the rod is rotated in one direction, one set of teeth engages the large gear and when rotated in the opposite direction, the other set of teeth engages the small gear.

Any given movement of the pointer shaft produces identical angular movements of the two gears. However, since the gears are of different diameter, corresponding peripheral points move different linear distances. Thus, with the rack engaging the small gear, the pen will be moved a given linear distance per angular movement of the gears and when the rack engages the large gear, a greater corresponding linear movement will be imparted to the rack. A knob is provided on one end of the gear to provide for selective engagement of the rack with one or the other of the gears. Thus, by the operator merely turning the knob, magnification of the recording may be easily effected.

The invention also contemplates means for preventing over-travel of the pen. This takes the form of certain cams or abutments which are disposed along the path of movement of the rod and operate to break the engagement of the rack with either gear and accordingly, stop movement of the pen.

The manner in which the foregoing is accomplished will be apparent from the following description and drawings wherein:

Figure 2 is an enlarged elevational view of the mechanism of Figure 1 looking from the right-hand side;

Figure 5 is a fragmentary view showing a portion of a testing machine and a portion of a recorder together with the recorder pen attached to the rod.

Figure 1:
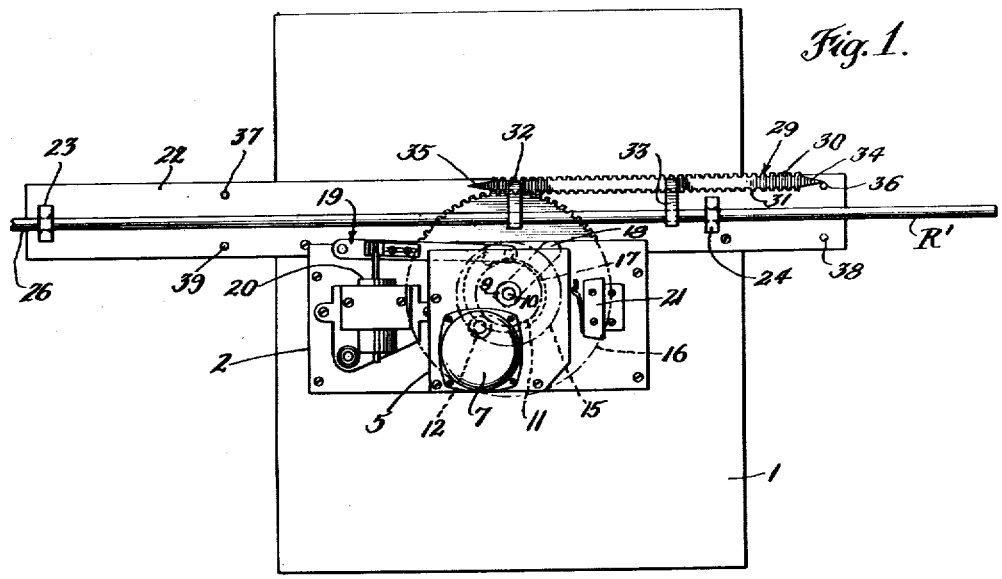
Figure 1 is an elevational view of certain parts of the mechanism of the invention.

Figure 5 shows a portion of a housing H of a testing machine having a calibrated scale S over which a pointer P is adapted to be moved. Secured on the side of the housing is a recorder R having a rotatable drum D and a pen P'. The pen is secured to a rod R' which is adapted to move the pen back and forth over the surface of the drum. The description which follows concerns the mechanism for driving the rod, hence the pen, over the surface of the drum.

In Figure 2 a plate 1 is adapted to be secured within the housing H. A mounting plate 2 carrying certain mechanism which will be mentioned later, is connected with the plate 1 by mounting studs 4—4. Another mounting plate 5 is secured to the mounting plate 2 by the mounting studs 6—6. The mounting plate 5 carries a servo motor 7, the manner in which the servo motor is operated being described in my copending application. Bearings 8 and 9 respectively mounted in plates 2 and 5, carry the indicating pointer drive shaft 10, the shaft being connected with and adapted to rotate a pointer such as indicated by the letter P in Figure 5. A gear 11 is secured to the drive shaft 10 and this gear meshes with a pinion 12 rotated by the servo motor 7. Thus, it will be apparent that rotation of the motor rotates the pointer drive shaft, the rotation being either clockwise or counterclockwise. The gear 11 is provided with a pin 13, which is adapted to engage a stop 14 on the plate 5 when the pointer shaft moves greater than a predetermined angular distance. This is to prevent over-travel of the pointer at the high end of the scale.

Also secured to pointer shaft 10 in spaced apart relationship are gears 15 and 16. As will be apparent, the gear 16 has a greater diameter than gear 15. In the preferred embodiment, the diameter of gear 16 is twice the diameter of gear 15 such that for the same angular movement of the gears, the ratio of linear movement of two corresponding peripheral points is 2:1.

A cam 17 and an operating arm 18 are also carried by pointer shaft 10. The cam operates cam follower mechanism generally indicated by 19, which actuates certain transducer mechanism generally indicated by 20. The operating arm 18 is adapted to actuate certain switch mechanism generally indicated by 21, to prevent over-travel of the pointer attached to the shaft 10. The functioning of the cam and transducer, the arm and the switch are fully described in my copending application and need not be mentioned further here.

As seen in Figures 1 and 2, a mounting bar 22 is secured to plate 1. The mounting bar carries bearings 23 and 24, which support the rod R' such that the rod may be moved in translation or may be rotated. The end of the rod designated by the numeral 26 is adapted to project through the housing H of the testing machine as indicated in Figure 5. The end 26 carries the pen P'. The pen is secured on the rod by an adapter 27 incorporating frictional means such that the rod and the pen move together but permitting rotation of the rod relative to the adapter. At the outer end of the rod is a knob 28, by means of which the rod may be rotated.

Figure 4:
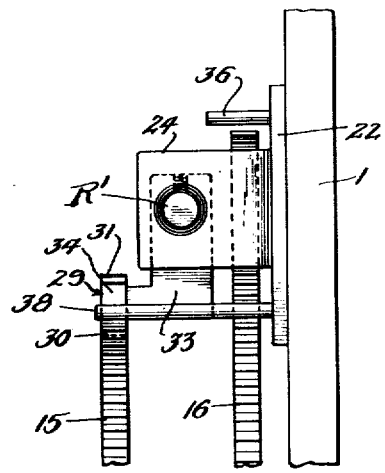
Figure 4 is a fragmentary view showing the rack engaged with the smaller gear.

A rack 29 having on opposing faces thereof teeth 30 and 31, is fixedly secured to the rod by means of right angle members 32 and 33. As will be seen from an inspection of Figures 2 and 4, when the rod is rotated in the clockwise direction (as viewed in Figure 2), the teeth 31 of the rack engage the large gear 16, and when the rod is rotated in the counter-clockwise direction, the teeth 30 of the rack engage the small gear 15, as shown in Figure 4.

It will be apparent that the selective engagement of the rack with gears of different diameter can change the ratio of movement of the pin with respect to the movement of the pointer or pointer shaft. Thus, the arrangement provides for magnification of the stress recording made by the pen. This is important because it enables a highly detailed study of specimen behavior in any portion of the stress range. For example, it is often desirable in test work to observe the action of the specimen in the early plastic stages. Thus, a test specimen may be loaded, say, up to or near the elastic limit with the rack engaged with gear 15. Then the knob 28 may be turned to engage the rack with gear 16. Upon further application of stress, the recording will be magnified, thus providing for a detailed study of the specimen in the plastic stages.

Figure 3:
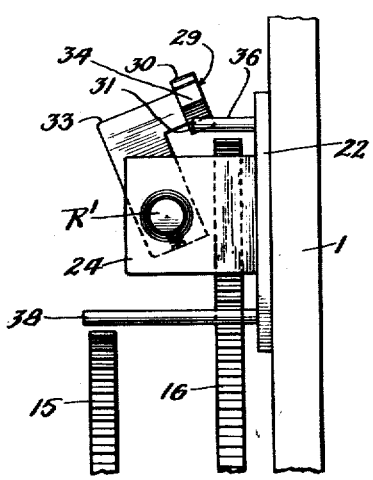
Figure 3 is a fragmentary view showing the rack engaging an abutment whereby the connection between the rack and the large gear is broken.

The invention contemplates certain safety features which prevent over-travel of the recorder pen. This is accomplished by cam surfaces associated with the rack 29. With reference to Figure 1, it will be observed that the rack has V-shaped sections 34 and 35. As the rack moves toward the right-hand side, the V-shaped section 34 will engage a pin or cam 36, which tends to rock or rotate the rack out of engagement with the gear 16, this action being clearly shown in Figure 3. When the rack is moved toward the left-hand side, the V-shaped section 35 contacts the pin 37 and rotates the rack out of engagement. When the rack is engaged with gear 15, the pins 38 and 39 operate in a manner described above.

It will also be apparent that the pen may be rendered inoperative by the twisting of knob 28 to disengage the rack from the gear and then moving the rod such that the rack engages one of the cams and rests thereon.

While I have described the invention in connection with recorder pens, it will be apparent that the invention may be applied in other arrangements, for example, when the rod is driven by a prime mover and the two gears connected to a mechanism to be driven.

I claim:

1. For use with a recorder for recording information, said recorder having a drum and a pen, a drive mechanism for the pen comprising: a rod connected with the pen and adapted to be rotated and to be driven in translation; a plurality of gears each of different diameter, each adapted to be rotated in accordance with information to be recorded; means connected with the rod and rotatable therewith to provide for driving interconnection of the rod alternatively with any of said gears; and cam means disposed along the path of movement of the rod and adapted to be contacted by last said means whereby to disengage said driving interconnection.

2. A drive system comprising in combination: two gears each of different diameter and mounted in spaced apart planes generally parallel to one another; a rod disposed intermediate said gears and mounted for both rotational and translational movement in a plane generally parallel to the planes of said gears; and a rack having sets of teeth respectively on opposing faces thereof mounted on said rod and arranged whereby rotation of the rod in one direction engages one set of teeth of the rack with one gear and rotation of the rod in the opposite direction engages the other set of teeth of the rack with the other gear.

3. For use with a recorder for recording information, said recorder having a drum and a pen, a system for driving the pen comprising: two rotatable driven gears each of different diameter mounted on common drive means; a rotatable rod connected with said pen and adapted to be driven in translation by either of said gears; and a rack connected with the rod and adapted upon rotation of the rod to be selectively engaged with either of said gears whereby the rod is moved in translation in accordance with the movement of the engaged gear.

4. A construction in accordance with claim 4 further including cam means disposed along the path of movement of said rod and adapted to engage said rack when being driven by either of said gears whereby to move the rack out of said engagement.

5. A construction in accordance with claim 5 wherein said rack has a V-shaped section at each end thereof and said cam means comprises two pairs of pins.

6. For use with a recorder for recording information, said recorder having a drum and a pen, a drive mechanism for the pen comprising: a rod connected with the pen and adapted to be rotated and to be driven in translation; a plurality of gears each of different diameter, each adapted to be rotated in accordance with information to be recorded; and means connected with the rod and rotatable therewith to provide for driving interconnection of the rod alternatively with any of said gears.

References Cited in the file of this patent
UNITED STATES PATENTS

| | | |
|---|---|---|
| 245,080 | Long | Aug. 2, 1881 |
| 418,281 | Elliot | Dec. 31, 1889 |
| 1,720,148 | Rodanet | July 9, 1929 |
| 2,462,226 | Rosenow | Feb. 22, 1949 |
| 2,494,706 | Happel | Jan. 17, 1950 |
| 2,555,995 | Pitzer | June 5, 1951 |
| 2,630,021 | Levin | Mar. 3, 1953 |
| 2,684,599 | Fisher | July 27, 1954 |

UNITED STATES PATENT OFFICE
CERTIFICATE OF CORRECTION

Patent No. 2,815,675

Robert S. Strimel

December 10, 1957

It is hereby certified that error appears in the printed specification of the above numbered patent requiring correction and that the said Letters Patent should read as corrected below.

Column 3, line 15, for "pin" read -- pen --; column 4, line 29, for the claim reference numeral "4" read -- 3 --; line 34, for the claim reference numeral "5" read -- 4 --; same column 4, list of references cited, under the heading "UNITED STATES PATENTS" strike out the following:

418,281 Elliot - - - - Dec. 31, 1889
2,630,021 Levin - - - - Mar. 3, 1953
2,684,599 Fisher - - - - July 27, 1954

Signed and sealed this 4th day of February 1958.

(SEAL)
Attest:
KARL H. AXLINE

Attesting Officer

ROBERT C. WATSON
Commissioner of Patents